United States Patent
Singh et al.

(10) Patent No.: US 10,394,602 B2
(45) Date of Patent: Aug. 27, 2019

(54) SYSTEM AND METHOD FOR COORDINATING PROCESS AND MEMORY MANAGEMENT ACROSS DOMAINS

(71) Applicants: BlackBerry Limited, Waterloo (CA); 2236008 Ontario Inc., Waterloo (CA)

(72) Inventors: Ravi Singh, Toronto (CA); Daniel Jonas Major, Ottawa (CA); Sivakumar Nagarajan, Ottawa (CA); Kevin Goodman, Nepean (CA)

(73) Assignees: BlackBerry Limited, Waterloo (CA); 2236008 Ontario Inc., Kanata (CA)

( * ) Notice: Subject to any disclaimer, the term of this patent is extended or adjusted under 35 U.S.C. 154(b) by 14 days.

(21) Appl. No.: 14/290,378

(22) Filed: May 29, 2014

(65) Prior Publication Data

US 2015/0347190 A1    Dec. 3, 2015

(51) Int. Cl.
*G06F 9/50* (2006.01)
*G06F 9/455* (2018.01)

(52) U.S. Cl.
CPC ............ *G06F 9/50* (2013.01); *G06F 9/45558* (2013.01); *G06F 9/5055* (2013.01); *G06F 2009/45583* (2013.01)

(58) Field of Classification Search
CPC ...... G06F 9/50; G06F 9/5055; G06F 9/45558; G06F 2009/45583
See application file for complete search history.

(56) References Cited

U.S. PATENT DOCUMENTS

| | | | | |
|---|---|---|---|---|
| 7,581,223 B2 * | 8/2009 | Harjula | ........... | G06F 9/4843 718/102 |
| 8,056,081 B2 * | 11/2011 | Mathur | ........... | G06F 9/44594 718/104 |
| 8,521,880 B1 * | 8/2013 | Richardson | ....... | G06F 15/17306 705/500 |
| 2003/0233329 A1 * | 12/2003 | Laraki | ........... | G06Q 20/123 705/52 |
| 2009/0158299 A1 * | 6/2009 | Carter | ........... | G06F 9/4843 719/319 |
| 2009/0327421 A1 * | 12/2009 | Fu | ........... | G06F 17/3089 709/204 |
| 2012/0331469 A1 * | 12/2012 | Van Peursem | ........... | G06F 9/485 718/100 |
| 2013/0061250 A1 * | 3/2013 | Kothandapani | ..... | G06F 9/45537 719/320 |

(Continued)

OTHER PUBLICATIONS

Canadian Intellectual Property Office, Office Action on Application No. 2,892,716, dated May 30, 2016.

(Continued)

*Primary Examiner* — Benjamin C Wu
*Assistant Examiner* — Michael W Ayers
(74) *Attorney, Agent, or Firm* — Moffat & Co

(57) ABSTRACT

A method at a computing device having a plurality of concurrently operative operating systems, the method comprising: operating a proxy process within a target operating system on the computing device; receiving, from an originating operating system, a request for resources from a target process within the target operating system at the proxy process; requesting, from the proxy process, the resources of the target process; and returning a handle to the target process from the proxy process to the originating operating system.

15 Claims, 7 Drawing Sheets

(56) References Cited

U.S. PATENT DOCUMENTS

| | | | | |
|---|---|---|---|---|
| 2013/0086696 A1* | 4/2013 | Austin | ................ | G06F 21/335 |
| | | | | 726/28 |
| 2013/0260730 A1 | 10/2013 | Toy et al. | | |
| 2013/0304923 A1* | 11/2013 | Clay | .................. | G06F 9/5027 |
| | | | | 709/226 |
| 2014/0032601 A1* | 1/2014 | Kanigicherla | .... | G06F 17/30194 |
| | | | | 707/781 |
| 2014/0082140 A1* | 3/2014 | Toussaint | ............ | H04L 67/2814 |
| | | | | 709/217 |
| 2015/0227547 A1* | 8/2015 | Davis | ................ | G06F 17/30168 |
| | | | | 707/822 |

OTHER PUBLICATIONS

European Patent Office, Office Action for Application No. 15169230.8, dated Nov. 12, 2015.
Canadian Intellectual Property Office, Office Action issued for Application No. 2892716, dated Jun. 5, 2017.
European Patent Office, Examination Report for Application No. 15169230.8, dated Jun. 20, 2017.
Canadian Intellectual Property Office, Office Action for Application No. 2,892,716, dated Feb. 19, 2018.
Canadian Intellectual Property Office, Examination Report for Application No. 2,892,716, dated Dec. 20, 2018.
European Patent Office, Examination Report for Application No. 15169230.8, dated Oct. 30, 2018.

* cited by examiner

SYSTEM AND METHOD FOR COORDINATING PROCESS AND MEMORY MANAGEMENT ACROSS DOMAINS

FIELD OF THE DISCLOSURE

The present disclosure relates to process and memory management, and in particular relates to process and memory management in a system having a plurality of operating systems running concurrently.

BACKGROUND

Mobile devices, including smartphones, tablets, digital assistants, laptop computers, among others include both hardware and software. The software typically includes at least one operating system on which the applications of the device run.

In some cases, it may be desirable for security purposes to run multiple virtualized instances of an operating system on a single piece of hardware, such as a smartphone. For example, one use of such a system may be to allow one operating system to host corporate data and applications while a second operating system may host personal data and applications.

However, with multiple operating systems, process management across the multiple operating systems will not function when using single operating system techniques.

BRIEF DESCRIPTION OF THE DRAWINGS

The present disclosure will be better understood with reference to the drawings, in which.

DETAILED DESCRIPTION OF THE DRAWINGS

The present disclosure provides a method at a computing device having a plurality of concurrently operative operating systems, the method comprising: operating a proxy process within a target domain on the computing device; receiving, from an originating domain, a request for resources from a target process within the target domain at the proxy process; requesting, from the proxy process, the resources of the target process; and returning a handle to the target process from the proxy process to the originating domain.

The present disclosure further provides a computing device having a plurality of concurrently operating domains, the computing device comprising: a processor; and memory, wherein the computing device is configured to: operate a proxy process within a target domain on the computing device; receive, from an originating domain, a request for resources from a target process within the target domain at the proxy process; request, from the proxy process, the resources of the target process; and return a handle to the target process from the proxy process to the originating domain.

The present disclosure provides for process management across multiple operating systems. As used herein, the term operating system may refer to software on a computing device having its own operating system stack.

Figure 1:
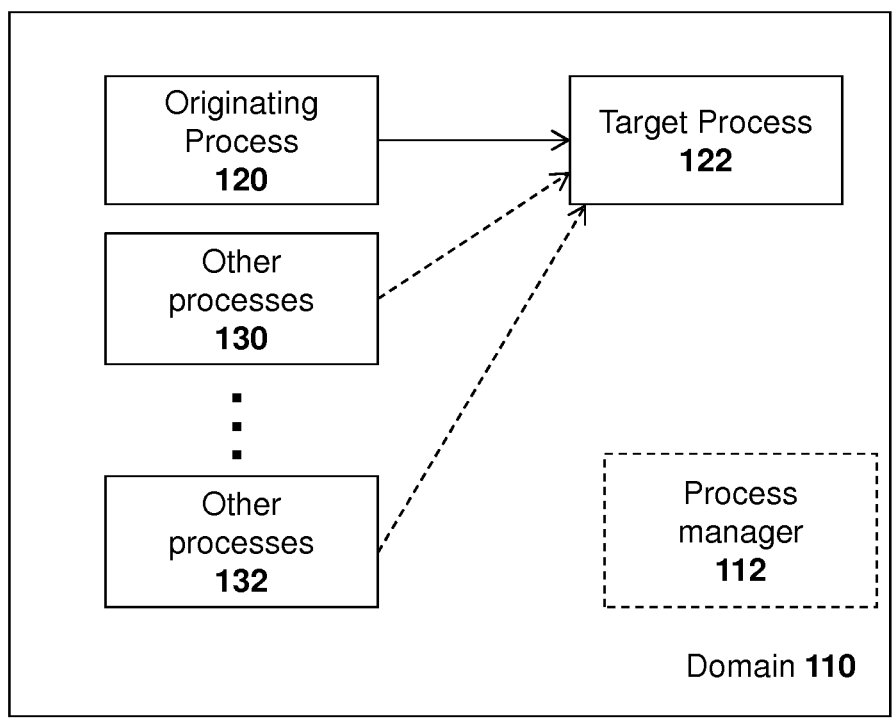
FIG. 1 is a block diagram showing process management in a single operating system environment.

Reference is now made to FIG. 1, which shows a device having a single domain 110 having a single operating system. Normally, within a single operating system, one process, referred to an originating process, may make a request for a resource that in turn requires the operating system to launch some other process, referred to herein as a target process, to service such request. Because the operating system is aware of both of the calling process and the newly launched process, the operating system knows when the newly launched process can be cleaned up. For example, cleaning up the process may involve freeing the memory used by the process, whether actual or virtual, and reducing objects on the stack or heap of the operating system, among other functionalities.

Thus, in FIG. 1, originating process 120 needs a resource that is found within target process 122. Other processes shown as processes 130 to 132 may also need the same target process.

A tracking mechanism within the operating system may be used to track the both originating processes and the target processes. Such an entity is shown as a logical process manager 112 in the example of FIG. 1.

Because the operating system is aware of the originating process 120 and the target process 122, when the originating process 120, and any other processes making use of target process 122, have all shut down, the target process 122 may no longer be needed. The operating system may then clean up target process 122 when needed.

In other embodiments, originating process 120 may provide information to the operating system that it no longer requires the resources of the target process 122. Again, if no other processes are using target process 122, the operating system may then clean up target process 122 when needed.

In other embodiments, the operating system may wish to shut down target process 122 because the system is running low on memory. In this case, because originating processes are dependent on the target process, the operating system may make a decision to shut down the target process 122 based on whether a user is interacting with, or is likely to interact with, the originating process 120. For example, if the originating process 120 is in the foreground, shutting down the target process may not be possible without shutting down the originating process, which may be detrimental to a user experience.

Once the process manager 112 determines that no processes are using the target process 122, target process 122 may be shut down at the discretion of the operating system.

One example of such a system may include one where "content providers" or "services" are backed by other processes. For example, an application may request a content provider providing "contacts" on a mobile device, to allow the originating process shows a list of contacts to a user. The originating process would be the program that wants to show the list of contacts to the user, and the target process 122 would be the contacts content provider.

Thus, if the originating process is launched and needs a list of contacts, it would request this process, which results in the launching of the contacts process, if not already running. The originating process 120 would be given a handle to the contacts process in order to communicate or fetch information from the target process.

When the originating process and all other processes using the contacts content provider shut down and/or release the communications channel to the contacts process, or if the operating system runs into a low memory situation, the contacts process may become eligible for shutting down.

While the above works in a single operating system environment, sometimes it may be desirable for security purposes to run multiple virtualized instances of an operating system on a single piece of hardware or smart phone. For example, a device may be divided into multiple segments or domains. In one example, one domain could be used to host corporate data and applications, a second domain could be used to host personal data and applications, and a final domain could be used to provide a unified view of data across the other host operating systems, as needed. In other cases, the multiple domains may be utilized for shared devices such as a device that is shared between a parent and a child, wherein the security settings on the child's space may be stricter and access to certain data more limited than in an adult space. In some embodiments, each domain may comprise its own operating system or its own virtualized instance of an operating system. Although in the examples below refer to multiple domain environments, other examples of multiple operating system environments are also possible.

Figure 2:
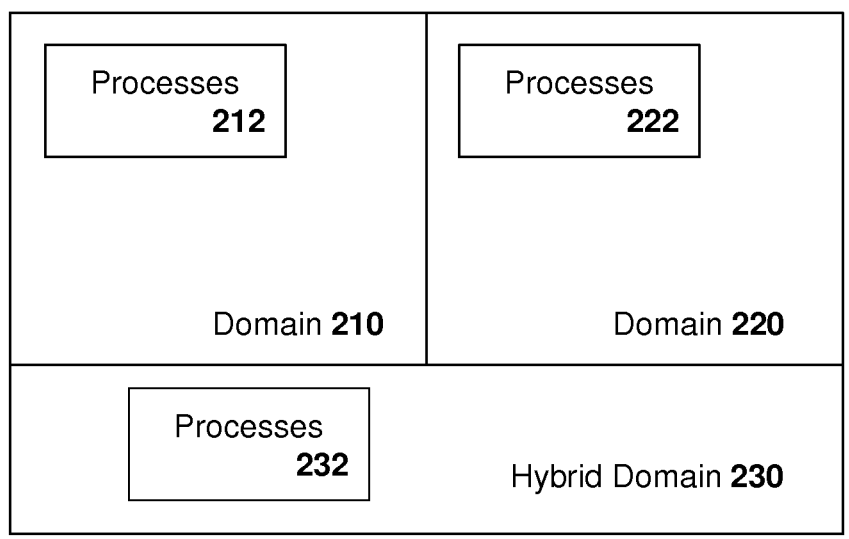
FIG. 2 is a block diagram showing an example device having multiple operating systems.

Reference is now made to FIG. 2. FIG. 2 shows an example of a system having three domains which may each have an associated operating system. In the example of FIG. 2, a domain 210 includes processes 212. A domain 220 includes processes 222 and a hybrid domain 230, which may have access to the resources of domain 210 and domain 220, has processes 232.

The operating systems for each of domains 210, 220 and 230 may include a logical entity within the operating system for process management to manage the processes that are started by another process or used by another process within that operating system. However, managing the use of a process in a difference operating system than the originating process becomes more complicated. In such an environment, the originating process itself may be in one domain with a host operating system, referred to herein as an originating operating system, and may request resources from another domain with a separate operating system, referred to herein as a target operating system. Those resources may in turn force the target operating system to launch a process or allocate additional memory. However, since the target operating system has no concept about the processes running in the originating operating system, the target operating system cannot know when the target process is eligible to shut down.

Further, there may potentially be multiple originating operating systems all with processes using resources of the target operating system.

Figure 3:
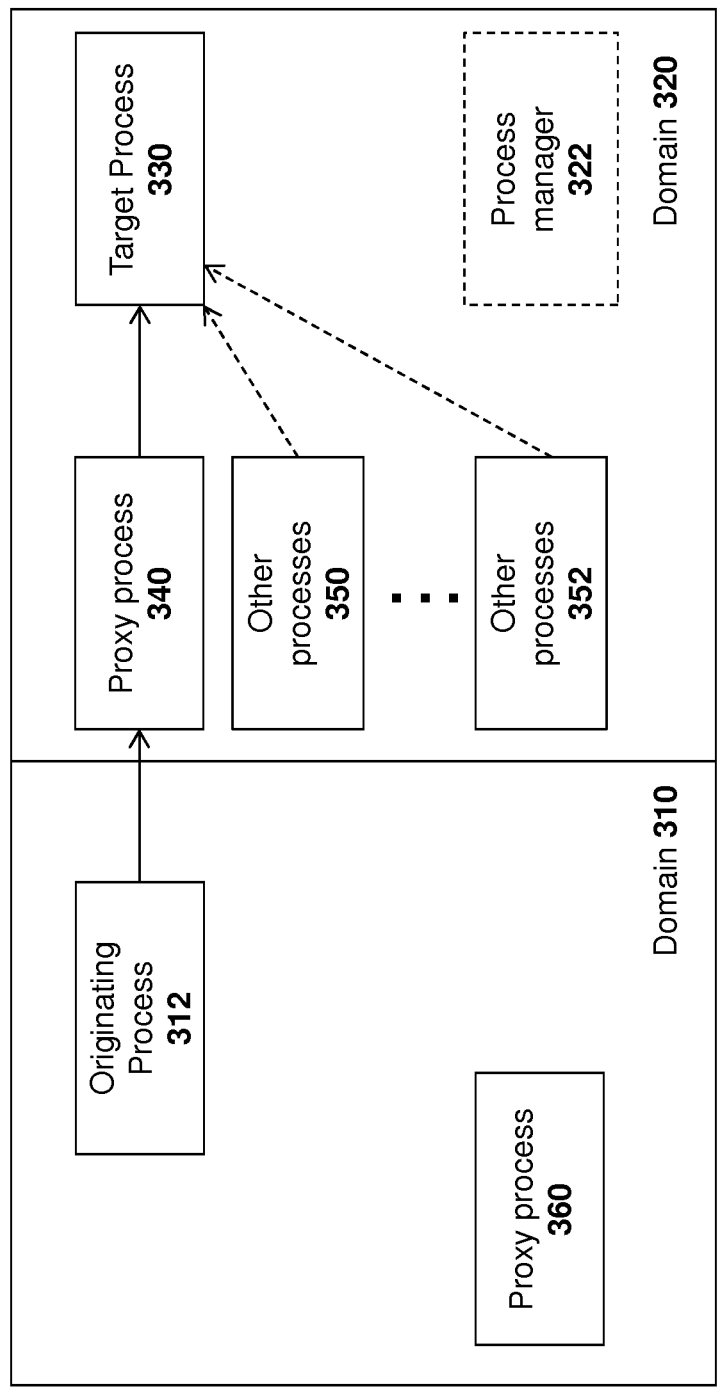
FIG. 3 is a block diagram showing the use of a proxy process in a multi-operating system environment.

Thus, in accordance with one embodiment of the present disclosure, a proxy process is inserted into each operating system in order to allow for cross domain process cleanup. Reference is now made to FIG. 3.

In the example of FIG. 3, a domain 310 includes an originating process 312 which needs resources from a target process 330 within a domain 320. Domain 320 includes a logical process manager 322 which has no knowledge about originating process 312.

Therefore, in accordance with the present disclosure, a proxy process 340 may be inserted into the target operating system of domain 320. One job of the proxy process 340 is to open connections to resources such as content providers on behalf of other operating systems on the device. Since proxy process 340 is a genuine process within the target domain 320, target domain 320 can track it and whatever resources that the proxy process 340 has open in a similar manner to the way that operating systems track resources opened by other processes, without the need for any changes within the target domain 320.

In accordance with one embodiment of the present disclosure, proxy process 340 may be marked to not be allowed to shut down, even when the system is running low on memory. This ensures that the resources being targeted are not taken down, since the originating process may, for example, be in the foreground and interacting with a user.

Other processes, shown as processes 350 to 352, also may operate within domain 320 and may also require resources from target process 330. As indicated above, the process manager 322 may keep track of all processes that are using target process 330 and may decide when target process 330 becomes eligible to be cleaned up. Proxy process 340 falls within the group of processes that may have a handle to target process 330.

In one embodiment, each domain may have a proxy process in order to allow other domains access to the processes within that domain. Thus, in the example of FIG. 3, a proxy process 360 exists within the operating system of domain 310, and may be used to open connections to resources like content providers on behalf of other operating systems on a computing device.

The example of FIG. 3 includes two domains for illustrative purposes only. In other embodiments multiple domains may access resources on domain 320 through a proxy process 340.

Figure 4:
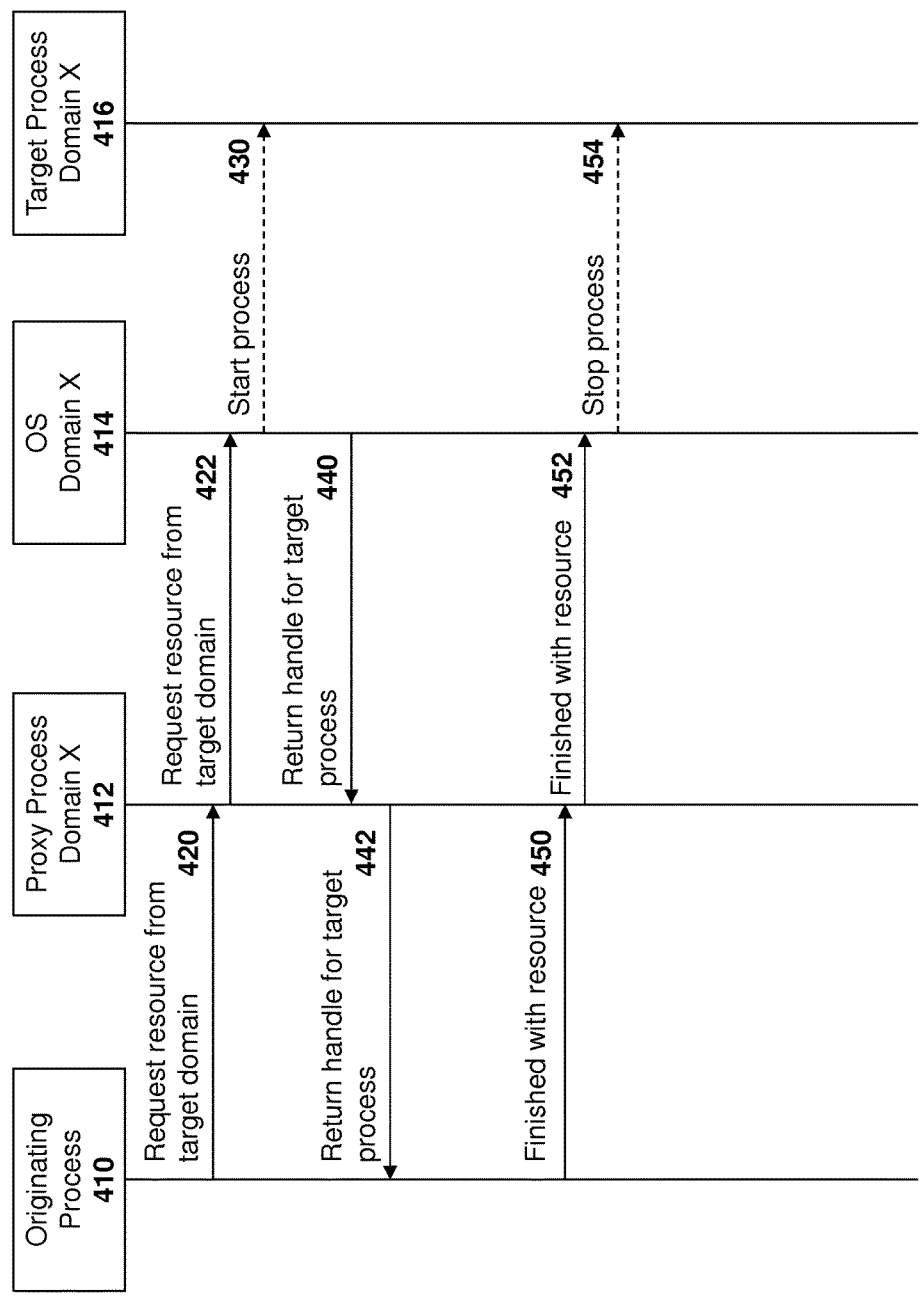
FIG. 4 is a data flow diagram showing the obtaining and releasing of resources in a multi-operating system environment.

Reference is now made to FIG. 4 which illustrates an embodiment wherein a device comprises multiple domains each comprising a separate operating system. When an originating operating system wishes to request a resource from a target operating system, the originating operating system will ask the proxy application in the target operating system to request the resource on its behalf. Thus, as seen in FIG. 4, originating process 410 is in a first domain and wants resources from a target process 416 that is in a second domain. Originating process 410 communicates through a proxy process 412 in the second domain. Proxy process 412 interacts with the second domain 414.

Originating process 410 requests a resource from the target operating system by communicating with the proxy process 412, as shown by message 420. The form of message 420 may, for example, be a call to an application program interface (API) within a domain. For example, message 420, if within a single domain, may simple utilize a regular API and be of a form "content://contacts". On the other hand, if the request is between domains, then a uniform resource indicator (URI) could be added to the message. Thus, the message may be in the form "content://domain x/contacts" where "domain x" is the URI for the domain on which the target process resides.

Once the proxy process 412 receives the request, it may then request resources from the target operating system 414, as shown by message 422.

The target operating system may, in some embodiments, then check its own internal registry to see which process or application backs the resource, and may start an appropriate target process if such process is not already running using, for example, a dynamic target process identifier, as shown by arrow 430. Further, the operating system 414 may then return a handle for the target process 416 to the proxy process 412, as shown by a message 440.

Proxy process 412 will then return a handle for the target process to the originating process 410, as shown by message 442.

Originating process 410 may then interact with target process 416 using the handle that was provided in message 442.

In one embodiment, the proxy process 412 may keep a table of processes that it currently has handles for. Thus, for example, a table such as Table 1 below may be keep by proxy process 412.

TABLE 1

Example Process Table In Proxy Process

| Originating Process ID | Domain ID | Resource ID |
| --- | --- | --- |
| 12345 | Domain X | 45611 |
| 12486 | Domain X | 45612 |
| 12745 | Domain Z | 45611 |
| 12345 | Domain Z | 46333 |

As seen in Table 1 above, the proxy process keeps a list of process identifiers of originating processes. As a will be appreciated by those skilled in the art, the process identifiers only have meaning in the domain of the originating process and have no meaning in the target domain. Therefore, Table 1 also includes an identifier for the domain of the originating process. Finally, Table 1 includes an identifier for the resource within the target operating system. The identifier shown in this last column of Table 1 identifies the resource within the target domain.

In other embodiments, more information could also be stored within the table of proxy process 412, and Table 1 is merely an example.

Using a table such as Table 1, proxy process 412 may inform the operating system 414 when it is finished using a resource. Proxy process 412 may know it is finished with a resource in several ways. For example, in the embodiment of FIG. 4, originating process 410 may provide an explicit indication to the proxy process 412 that it is finished with the resource. Such message is shown by message 450 in the embodiment of FIG. 4.

Once proxy process 412 receives message 450, if no other process from outside the target domain is using the resource identified by the resource identifier, then proxy process 412 may inform operating system 414 that it is finished with the resource using message 452.

The operating system 414 may then check to see whether or not other processes locally within the target domain are using the target process, and if not, the domain 414 may make a decision to stop the process and perform a cleanup of those resources used by the target process, as shown by arrow 454.

In the example of Table 1 above, if the originating process with an identifier "12345" from "Domain X" informs the proxy process 412 that it is finished with the resources for resource identifier "45611" then the proxy process 412 may make a determination that process "12745" from "Domain Z" still is using this process and therefore message 452 will not be sent. Conversely, from Table 1 above, it process "12486" from "Domain X" informs the proxy process 412 that resource identifier "45612" is no longer needed, then proxy process 412 checks the table, and since no other processes it knows about are using this resource, message 452 may be sent.

Figure 5:
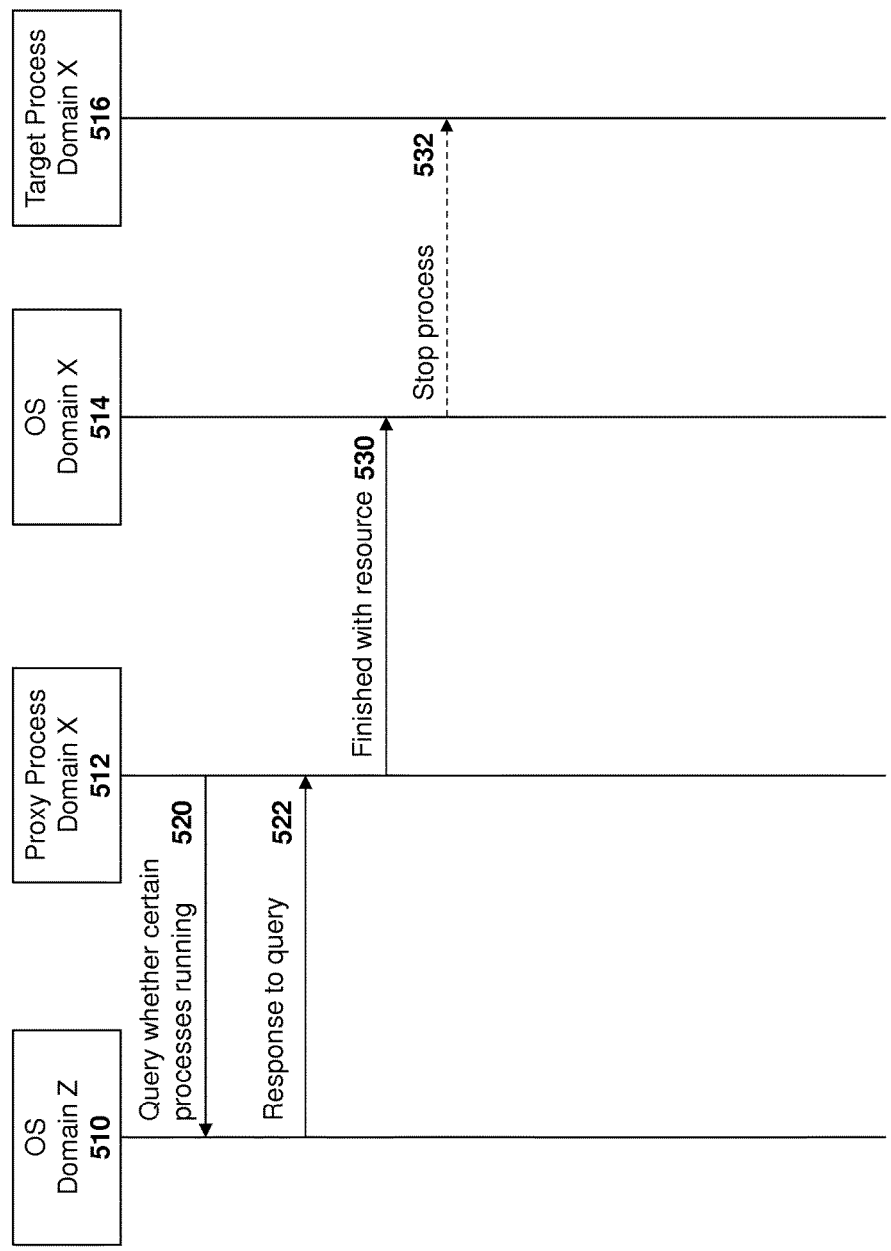
FIG. 5 is a data flow diagram showing a polling process to determine a status of an originating process at a proxy process.

In some embodiments, proxy process may need to be more active in determining whether or not the originating processes are still running. This may, for example, be used in cases when no explicit message is sent to indicate that the originating process is finished with the resource. Reference is now made to FIG. 5.

In FIG. 5, an operating system 510 interacts with a proxy process 512 in a second domain. The second domain includes an operating system 514 and a target process 516 providing a resource which has previously been requested by an originating process within domain 510.

In this case, proxy process 512 may occasionally send a query 520 to operating system 510 to determine whether certain processes are running in that domain. For example, from Table 1 above, the query may be a request for one or more of the originating process numbers within a particular domain. Thus, the query may be for processes "12345" and "12486" in domain "x" as well as processes "12745" and "12345" in domain "z". As will be appreciated, the identifier "12345" is used in both domain "x" and domain "z", but refers to different processes since each domain may have its own identifiers uniquely identifying processes within such domain.

In response to the query 520, the operating system 510 may provide response 522.

Upon receipt of response 522, proxy process 512 may update its table and based on the update, may then provide a message to the operating system 514 that it is finished with a particular resource identifier. Such communication is shown by message 530 and may result in operating system 514 cleaning up the resources of the target process, as shown by arrow 532.

Figure 6:
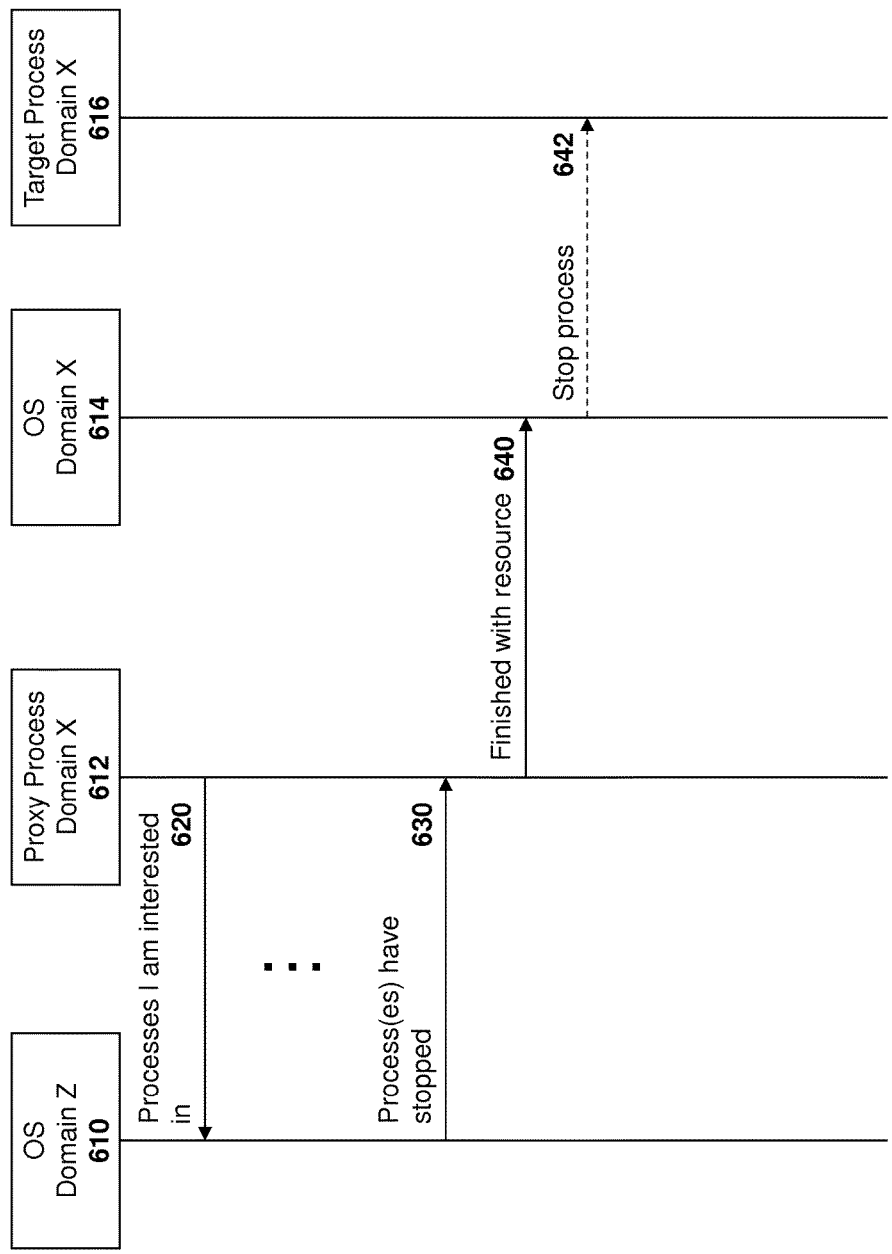
FIG. 6 is a data flow diagram showing a triggering process to obtain a status of an originating process at a proxy process.

In a further embodiment, a proxy process may register with an operating system of a particular domain to receive updates about particular processes. Reference is now made to FIG. 6.

In particular, in FIG. 6, Domain Z includes at least one originating process. Proxy process 612 within a second domain interacts with all other domains running on a particular computing device and may further interact with operating system 614 and obtain resources from a target process 616 within the second domain.

In the embodiment of FIG. 6, proxy process 612 may register with operating system 610 to indicate the processes that proxy process 612 is interested in. Such registration message 620 may include one or more of the originating processes within the table of the proxy process. Further, update messages may be sent as new originating processes request resources on the target domain.

When operating system 610 detects a change in one of the originating processes from message 620, operating system 610 may send a message 630 to the proxy process 612 indicating that one or more processes have stopped.

Proxy process 612 receives message 630 and updates its table. If no originating process from a different domain needs a particular resource identifier then the proxy process 612 may send a message 640 to the operating system 614 indicating that the proxy process is finished with the resource.

Upon receipt of message 640, the operating system 614 may determine whether any other processes are using target processes 616 and, if not, may choose to clean up the resources from target process 616, as shown by message 642.

Therefore, the above provides a proxy process that can be used to secure resources within each domain having target processes. The proxy process remains active at all times and allows the target operating systems to use existing tracking mechanisms and mappings of which processes are using which content providers. Further, in the embodiments herein, the proxy process is able to indicate a release of resources when the originating operating system no longer needs them.

The processes of any of FIGS. 3 to 6 may be stored as program code in any tangible, non-transitory computer readable medium, which when accessed by a processor on the computing device may cause the processes to be executed.

As will be appreciated by those in the art, the above may be implemented on any computing device. If the above is implemented on a mobile device, one example mobile device is provided with regard to FIG. 7.

Mobile device 700 may be a two-way wireless communication device having voice and data communication capabilities. Depending on the exact functionality provided, the mobile device may be referred to as a data messaging device, a two-way pager, a wireless e-mail device, a cellular telephone with data messaging capabilities, a wireless Internet appliance, a wireless device, a user equipment (UE), or a data communication device, as examples.

Where mobile device 700 is enabled for two-way communication, it may incorporate a communication subsystem 711, including both a receiver 712 and a transmitter 714, as well as associated components such as one or more antenna elements 716 and 718, local oscillators (LOs) 713, and a processing module such as a digital signal processor (DSP) 720. Although not shown, communication subsystem 711 may include additional components. For example, mobile device 700 may comprise multiple receivers 712 and/or transmitters 714 to allow for simultaneous radio activity. In addition, as will be apparent to those skilled in the field of communications, the particular design of the communication subsystem 711 will be dependent upon the communication network in which the device is intended to operate.

Network access requirements will also vary depending upon the type of network 719. In some networks network access is associated with a subscriber or user of mobile device 700. A mobile device may require one or more smart cards which can contain different applications such as a USIM, RUIM or a SIM application in order to operate on a network. The smart card interface 744 is normally similar to a card-slot into which a smart card can be inserted and ejected. The smart card can have memory and hold many key configurations 751, and other information 753 such as identification, and subscriber related information.

Figure 7:
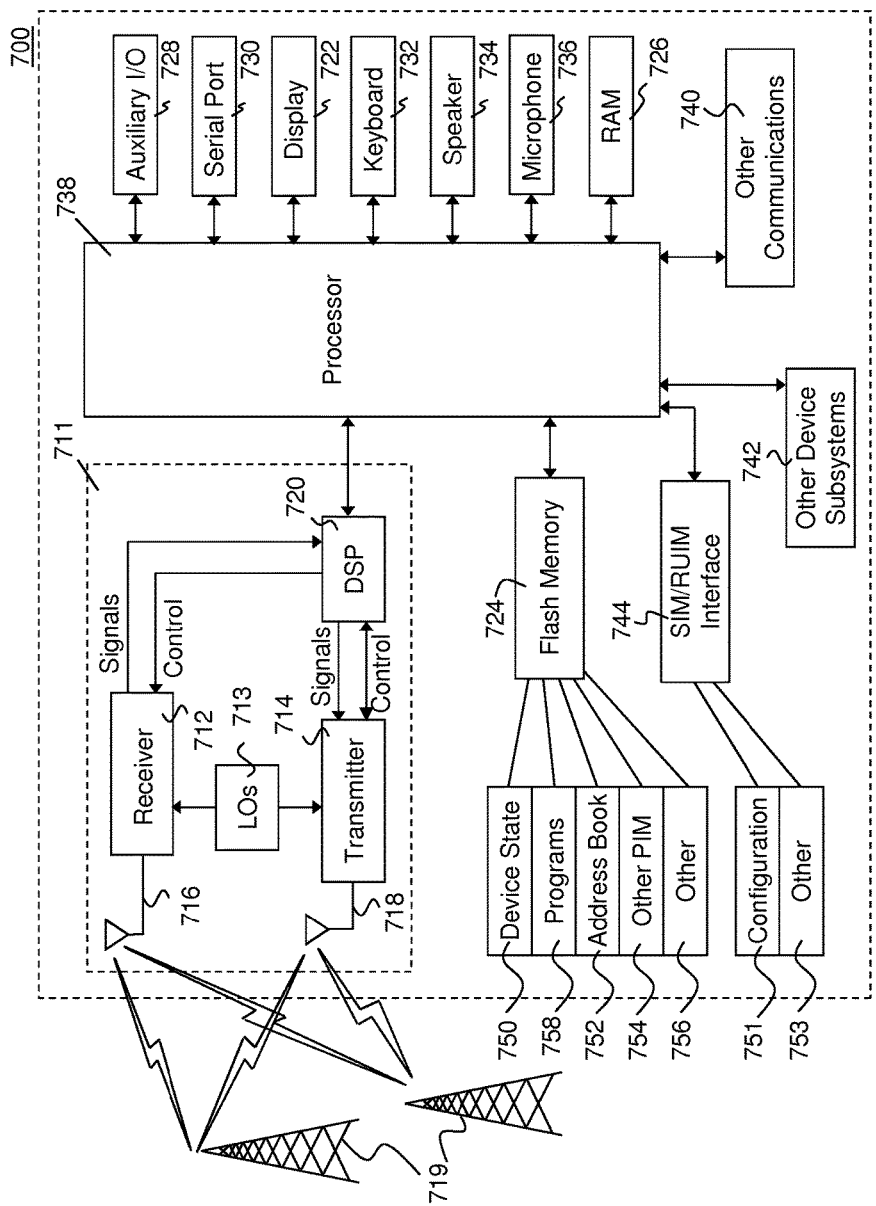
FIG. 7 is a block diagram of an example mobile device capable of being used with the embodiments of the present disclosure.

When required network registration or activation procedures have been completed, mobile device 700 may send and receive communication signals over the network 719. As illustrated in FIG. 7, network 719 can consist of multiple base stations communicating with the mobile device.

Signals received by antenna 716 through communication network 719 are input to receiver 712, which may perform such common receiver functions as signal amplification, frequency down conversion, filtering, channel selection and the like. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile device 700 generally includes a processor 738 which controls the overall operation of the device. Communication functions, including data and voice communications, are performed through communication subsystem 711. Processor 738 also interacts with further device subsystems such as the display 722, flash memory 724, random access memory (RAM) 726, auxiliary input/output (I/O) subsystems 728, serial port 730, one or more keyboards or keypads 732, speaker 734, microphone 736, other communication subsystem 740 such as a short-range communications subsystem and any other device subsystems generally designated as 742. Serial port 730 could include a USB port or other port known to those in the art.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the processor 738 may be stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Processor 738, in addition to its operating system functions, may enable execution of software applications on the mobile device. A predetermined set of applications that control basic operations, including at least data and voice communication applications for example, will normally be installed on mobile device 700 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 719. Further applications may also be loaded onto the mobile device 700 through the network 719, an auxiliary I/O subsystem 728, serial port 730, short-range communications subsystem 740 or any other suitable subsystem 742, and installed by a user in the RAM 726 or a non-volatile store (not shown) for execution by the processor 738. Such flexibility in application installation increases the functionality of the device and may provide enhanced on-device functions, communication-related functions, or both. For example, secure communication applications may enable electronic commerce functions and other such financial transactions to be performed using the mobile device 700.

In a data communication mode, a received signal such as a text message or web page download will be processed by the communication subsystem 711 and input to the processor 738, which may further process the received signal for output to the display 722, or alternatively to an auxiliary I/O device 728.

A user of mobile device 700 may also compose data items such as email messages for example, using the keyboard 732, which may be a complete alphanumeric keyboard or telephone-type keypad, whether virtual or real, among others, in conjunction with the display 722 and possibly an auxiliary I/O device 728. Such composed items may then be transmitted over a communication network through the communication subsystem 711.

For voice communications, overall operation of mobile device 700 is similar, except that received signals would typically be output to a speaker 734 and signals for transmission would be generated by a microphone 736. Alternative voice or audio I/O subsystems, such as a voice message recording subsystem, may also be implemented on mobile device 700. Although voice or audio signal output is generally accomplished primarily through the speaker 734, display 722 may also be used to provide an indication of the identity of a calling party, the duration of a voice call, or other voice call related information for example.

Serial port 730 in FIG. 7 would normally be implemented in a personal digital assistant (PDA)-type mobile device for which synchronization with a user's desktop computer (not shown) may be desirable, but is an optional device component. Such a port 730 would enable a user to set preferences through an external device or software application and would extend the capabilities of mobile device 700 by providing for information or software downloads to mobile device 700 other than through a wireless communication network. The alternate download path may for example be used to load an encryption key onto the device through a direct and thus reliable and trusted connection to thereby enable secure device communication. As will be appreciated by those skilled in the art, serial port 730 can further be used to connect the mobile device to a computer to act as a modem.

Other communications subsystems 740, such as a short-range communications subsystem, is a further optional component which may provide for communication between mobile device 700 and different systems or devices, which need not necessarily be similar devices. For example, the subsystem 740 may include an infrared device and associated circuits and components or a Bluetooth™ communication module to provide for communication with similarly enabled systems and devices. Subsystem 740 may further include non-cellular communications such as WiFi or WiMAX.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a computing device having a plurality of concurrently operative operating systems including an originating operating system, comprising at least one originating process, and a target operating system, comprising one or more resources, the method comprising:

operating a proxy process within the target operating system on the computing device, the proxy process being marked to avoid being shut down even if the target operating system is running low on memory;

receiving, by the proxy process, from the originating operating system, a first request for the at least one originating process to interact with a resource of the one or more resources from the target operating system, the first request including at least one process identifier identifying the at least one originating process, and a resource identifier that identifies the requested resource;

sending a second request, from the proxy process to the target operating system, for the resource;

determining, by the target operating system, that no process currently running within the target operating system provides access to the resource;

responsive to the determining, starting, by the target operating system, a target process;

providing access to the resource to the target process;

returning a handle to the target process from the proxy process to the originating operating system, the handle enabling the at least one originating process to interact directly with the target process within the target operating system to thereby interact with the resource, wherein the proxy process maintains an association between process identifiers of one or more processes external to the target operating system, including the at least one originating process, and resource identifiers of the one or more resources with which the external processes interact;

receiving, at the proxy process, from the at least one originating process in the originating operating system, an indication that the at least one originating process no longer interacts with the requested resource, the indication comprising the resource identifier;

receiving, at the target operating system, from the proxy process, an indication that the requested resource is no longer needed by the proxy process upon determining, based on the association maintained by the proxy process, that no process external to the target operating system interacts with the requested resource identified by the resource identifier; and ending, by the target operating system, the target process.

2. The method of claim 1, further comprising populating a table within the proxy process with an identifier for the originating process within the originating operating system, an identifier for the originating operating system, and the resource identifier.

3. The method of claim 2, further comprising removing entries from the table when the originating process is finished with the resource.

4. The method of claim 3, further comprising informing the target operating system that the proxy process is finished with the resource if no entries in the table contain an identifier for the resource.

5. The method of claim 3, wherein the proxy process polls the originating operating system regarding a status of the originating process.

6. The method of claim 3, wherein the proxy process registers a trigger with the originating operating system to be informed when the originating process ends.

7. The method of claim 1, wherein the target process is a content provider.

8. A computing device having a plurality of concurrently operative operating systems including an originating operating system, comprising at least one originating process, and a target operating system, comprising one or more resources the computing device comprising:

a processor; and
memory, wherein the computing device is configured to:

operate a proxy process within the target operating system on the computing device, the proxy process being marked to avoid being shut down even if the target operating system is running low on memory;

receive, by the proxy process, from the originating operating system, a first request for the at least one originating process to interact with a resource of the one or more resources from the target operating system, the first request including at least one process identifier identifying the at least one originating process, and a resource identifier that identifies the requested resource;

send a second request, from the proxy process to the target operating system, for the resource;

determine, by the target operating system, that no process currently running within the target operating system provides access to the resource;

responsive to the determining, start, by the target operating system, a target process, the target process holding the resource;

providing access to the resource to the target process;

return a handle to the target process from the proxy process to the originating operating system, the handle enabling the at least one originating process to interact directly with the target process within the target operating system to thereby interact with the resource, wherein the proxy process maintains an association between process identifiers of one or more processes external to the target operating system, including the at least one originating process, and resource identifiers of the one or more resources with which the external processes interact;

receive, at the proxy process, from the at least one originating process in the originating operating system, an indication that the at least one originating process no longer interacts with the requested resource, the indication comprising the resource identifier;

receive, at the target operating system, from the proxy process, an indication that the requested resource is no longer needed by the proxy process upon determining, based on the association maintained by the proxy process, that no process external to the target operating system interacts with the requested resource identified by the resource identifier; and end, by the target operating system, the target process.

9. The computing device of claim 8, wherein the computing device is further configured to populate a table within the proxy process with an identifier for the originating process within the originating operating system, an identifier for the originating operating system, and the resource identifier.

10. The computing device of claim 9, wherein the computing device is further configured to remove entries from the table when the originating process is finished with the resource.

11. The computing device of claim 10, wherein the computing device is further configured to inform the target operating system that the proxy process is finished with the resource if no entries in the table contain an identifier for the resource.

12. The computing device of claim 10, wherein the proxy process polls the originating operating system regarding a status of the originating process.

13. The computing device of claim 10, wherein the proxy process registers a trigger with the originating operating system to be informed when the originating process ends.

14. The computing device of claim 8, wherein the target process is a content provider.

15. The computing device of claim 8, wherein the computing device is a mobile device.

* * * * *